Figure 1:
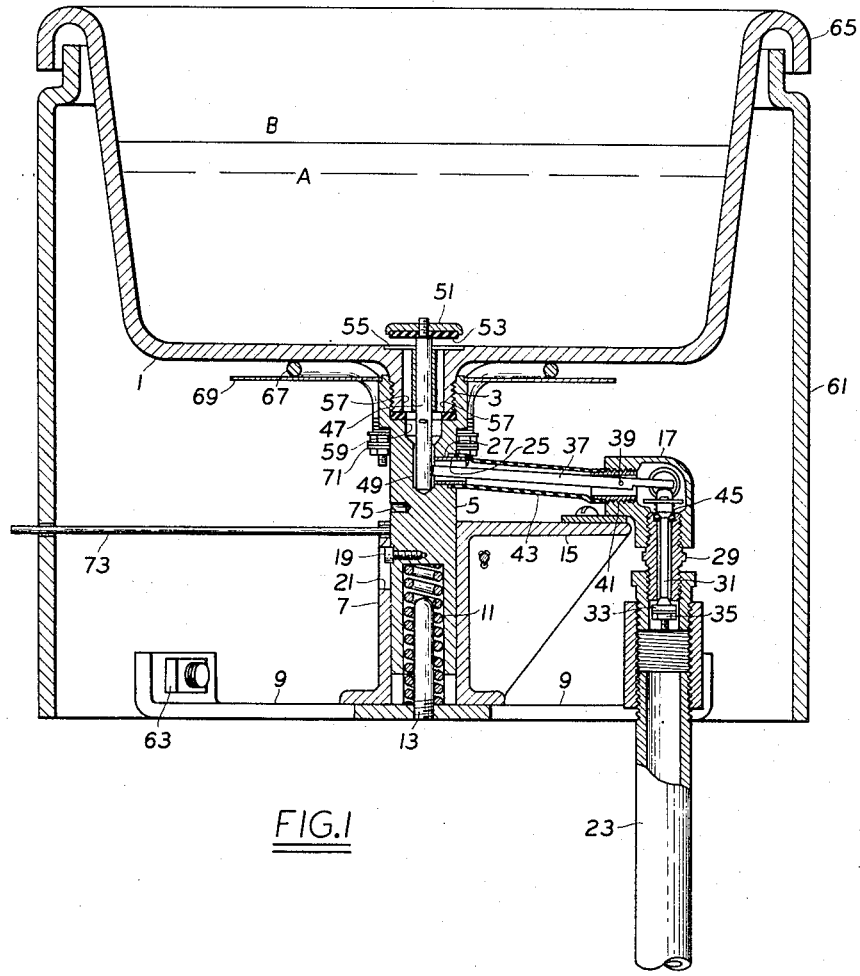

Sept. 11, 1956     D. W. SMITH     2,762,333
LIVESTOCK WATERERS
Filed July 12, 1954

INVENTOR.
DANIEL W. SMITH
BY Arthur R. Davis
ATTORNEY

United States Patent Office 2,762,333
Patented Sept. 11, 1956

2,762,333

LIVESTOCK WATERERS

Daniel W. Smith, Fort Wayne, Ind., assignor to Rhinehart Development Corporation, a corporation of Indiana Application July 12, 1954, Serial No. 442,748

8 Claims. (Cl. 119—81)

The present invention relates to improvements in livestock waterers.

The principal object of the present invention is to provide a rugged livestock waterer adapted to be used by a variety of livestock under a wide variety of conditions.

Another object of this invention is to provide a livestock waterer which is readily adaptable for use as a master unit in association with one or more captive or slave bowls supplying water at the same elevation.

A further object of this invention is to provide a livestock waterer which may be dismantled in part readily for cleaning.

Other objects of this invention include the provision of a unit for supplying a small volume of water which is continuously available with the minimum potential pollution.

The livestock waterer of the present invention comprises a housing with a base in the bottom thereof; a vertically positioned counterbalancing spring centrally located on the base; a water bowl assembly within the housing with a post supporting the water bowl proper and resting on the spring; a water supply to the water bowl comprising a rigid inlet conduit, an opening through the top of the supporting post communicating with the bottom of the water bowl, and a flexible conduit connecting the rigid inlet with the bottom of the opening in the supporting post; and valving means in the rigid conduit actuated through the flexible conduit responsive to changes in the elevation of the water bowl assembly during the introduction and removal of water in the water bowl proper.

Certain specific details of construction include: means to prevent excessive turbulence from water entering the bowl, protective association of upper portion of bowl and housing, and convenient means for removal of water bowl for cleaning and maintenance.

Fig. 1 is a part sectional view of the present invention.

The bowl 1, of suitable size and shape for containing water from which animals may drink, is mounted by screw threads 3 to supporting post 5, which is capable of limited vertical movement in trunk 7. Trunk 7 is fastened by any suitable means to cross or braces 9, which constitute the base of the waterer.

In the bottom of trunk 7, the coil spring 11 surrounds guide pin 13. Spring 11 provides sufficient upward thrust to exactly counteract the weight of all the immediately superposed assembly, including bowl 1, and the water within the bowl, up to a level just above the low level indicated by level A. Trunk 7 is provided with an extension on one side forming shelf 15 to which is attached valve housing 17. Upward and downward motion of supporting post 5 is limited by screw 19 operating in slot 21 in trunk 7.

Valve housing 17 in a single master bowl is shown as a standard two-way pipe elbow. However, if the master bowl is operated in conjunction with one or more captive or slave bowls, valve housing 17 is replaced by a valve housing consisting of any suitable and conventional three-way elbow, thus providing a side outlet between the valved inlet and the bottom of the master bowl.

Into the bottom leg of valve housing 17 is inserted valve body 29, in which valve stem 31 is connected at the bottom with a suitable resilient plug, as seal 33, held in place by threads and locknut 35. This entire valve assembly constitutes a rigid inlet conduit held firmly on shelf bracket 15.

The top of valve stem 31 rests against lever 37, one end of which extends above valve stem 31 and is fastened at a horizontal fulcrum point 39 consisting of a pin through nipple 41 mounted within the horizontal opening of housing 17.

This nipple 41 extends outwardly from the housing 17 in order to receive one end of flexible tube 43, which completely houses lever 37 and connects in liquid-tight fashion, nipple 41 from housing 17 to nipple 27 in post 5.

At the top of valve stem 31 is a small compression spring 45, which serves to keep the valve closed at the bottom of valve housing 29 by keeping the resilient plug 33 tightly over the bottom opening of housing 29 when the valve is in the non-operative position. This non-operative condition always prevails when the waterer is filled with water and the water is not being removed by animals.

In the center of the bottom of bowl 1, a small pin 47 extends downwardly into a cylindrical receptacle 49 in supporting post 5. Mounted on top of pin 47 is a disc or washer 51 under which is resilient disc 53 which is provided to seat on surface 55 when bowl 1 is detached from supporting post 5 by unscrewing threads 3.

Pin 47, washer 51, disc 53 and seat 55 remain with the bowl when it is removed and act as a check valve to prevent water from the bowl leaking out the bottom thereof, since the act of unscrewing the bowl causes disc 53 to seat on seat 55, thereby closing all water outlets. Around the opening for stem 47 is either one or a plurality of vertical openings 57 from chamber 59 in supporting post 5.

When water is at level A in bowl 1, the force of spring 11 raises post 5 and raises lever arm 37 which, acting through fulcrum 39, depresses valve stem 31 thereby opening the bottom of valve housing 29 and permitting water to pass between the resilient surface 33 and bottom opening in valve housing 29.

The water being supplied through line 23 passes through valve housing 29, through resilient tube 43 into chamber 59, and then through openings 57 into bowl 1, since the valve mechanism indicated by parts 51 and 53 is always open when bowl 1 is screwed down in proper position, being held open by stem 47 in contact with the bottom of receptacle 49 in which it is mounted.

The entire mechanism is supported by a housing 61 which is attached to base 9, such as by bolt and nuts 63. The top of housing 61 is reduced in diameter so as to receive the outwardly curved flanged edge 65 of bowl 1, and is so proportioned as to permit the free movement of bowl 1 with flange 65, upwardly and downwardly therearound.

Spring tension, weight of bowl assembly and other adjustments are made so that housing 61 supports bowl 1 rigidly when the water line is in full position represented by level B. In this position, bowl 1 will have settled downwardly until the flanged edge 65 is in juxtaposition with the bottom of the smaller ring section near the top of housing 61, thus providing substantial rigidity for bowl 1.

When bowl 1 is screwed down on threads 3 and properly affixed to post 5, the bottom of bowl 1 is forced into contact with heating element 67 held in place by plate 69. Heating element 67 is provided with terminals 71 to which electric current is supplied for the purpose of heating the water in the bowl and connections to a sufficient extent to prevent the water from freezing in cold weather. The heating element 67 may be supplied with the amount of electric current required continuously through terminals 71 to prevent freezing during the coldest period of the day or the application of electric current to heating element 67 may be controlled thermostatically, or by other suitable means without departing from the principles involved in this invention.

In operation, when the entire assembly is installed and connected to a suitable water supply through pipe 23, bowl 1 will be in a raised position, since the weight of the internal bowl assembly will be overcome by the force of spring 11 exerted in the upward direction. Water will then enter through valve 33 around valve stem 31 upwardly through housing 17 and nipple 41, around lever 37 and through flexible tube 43, through opening 25 around stem 47 through passage 49 and chamber 59, and through openings 57 to the inside of bowl 1. This movement of water is induced by the raising of lever 37 caused by the upward movement of post 5, originally induced by the force of spring 11. The raising of lever 37 pushes down valve stem 31, overcoming the force applied by spring 45.

As the water in bowl 1 rises, the weight of the entire assembly supported by spring 11 increases until the water level reaches level B, or thereabouts, whereupon the total weight on post 5 provides a downward force greater than the upward force of spring 11, causing post 5 to move downward in trunk 7 and overcoming the force of spring 11.

As this downward motion proceeds, lever 37 is caused to move around fulcrum 39 and relieve pressure from the top of valve stem 31. Valve spring 45 then raises valve stem 31 causing resilient plug 33 to close the opening in the bottom of valve stem 29, and thus shut off the flow of water to bowl 1.

When livestock consume water from bowl 1 and reduce the level of the water therein from level B to level A, or thereabouts, the total downward pressure of post 5 becomes less than the upward force provided by spring 11 and the bowl 1 and the entire assembly associated therewith is caused to rise within the limits provided by slot 21 and screw 19. This amount of movement is sufficient to again open the supply of water by raising lever 37, depressing valve stem 31 and removing plug 33 from the bottom opening in valve housing 29.

When it becomes necessary to remove any sediment which may have been introduced to bowl 1, or otherwise clean the bowl, this is accomplished easily by selective locking means wherein pin 73 is inserted through trunk 7 into drilled hole 75 in post 5, to hold post 5 in the closed or off position. When bowl 1 is in the lower position either due to the weight of water therein or as a result of pushing it downward, the drilled hole 75 is positioned at the inward end of said pin 73 and when said pin 73 is pushed inwardly the inward end of pin 73 enters and is engaged with drilled hole 75, thus holding the supporting post 5 in the lower position and holding the valve in housing 29 closed. Bowl 1 is then unscrewed easily by turning counterclockwise and removing from contact with post 5. During this operation the check valve, shown by parts 47, 51 and 53, closes thus preventing the water contained in the bowl 1 from being discharged from the bottom of bowl 1.

Since post 5 is held in a closed position by pin 73, no water is permitted to be discharged into housing 61 from pipe 23.

After cleaning bowl 1, it is returned to its assembled position by screwing threads 3 into post 5, thus seating the bowl against the heating element 65 and raising the check valve parts 47, 51 and 53. On withdrawing pin 73, post 5 will again rise, and in the cycle described above, fill bowl 1 until the water is again approximately at level B, which will cause the entire bowl assembly to settle and in doing so cut off the supply of water thereto.

The water level B is determined by the upward pressure exerted by spring 11, and can be varied at will by lengthening or shortening by any suitable means, such as the removal or addition of washers above or below the spring ends.

In the livestock waterer just described water can be admitted to the water bowl at an extremely rapid rate when the amount of water therein is reduced from level B to level A as the valve mechanism responsive thereto opens rapidly and closes rapidly when level B is reattained.

Another valuable feature resides in the fact that the water enters the bowl, even though at a rapid rate, without undue turbulence and thus the movement of the water does not deter animals from drinking their full requirement of water.

While the embodiment of my invention as described above is as it was invented and developed for practical use, it will be clearly understood that certain modifications therein may be made without departing from the spirit and scope of this invention.

I claim:

1. In a livestock waterer, the combination which comprises a housing with a base in the bottom thereof, a vertically positioned counterbalancing spring centrally located on said base, a water bowl assembly within said housing with a supporting post thereof resting on said spring, water conducting means to said bowl comprising a rigid inlet conduit, said supporting post provided with an opening in the top thereof communicating with the bottom of said bowl, and a flexible conduit connecting said rigid inlet with the bottom of said opening in said supporting post, and valving means in said rigid conduit actuated by a fulcrumed lever through said flexible conduit extending into said opening in said supporting post responsive to changes in elevation of said water bowl assembly and its supporting post during the introduction and removal of water in the water bowl proper.

2. The livestock waterer as defined in claim 1 wherein limiting means is associated with said base and said supporting post defining the extent of upward and downward movement of the water bowl assembly.

3. The livestock waterer as defined in claim 1 wherein the upper edge of the housing is recessed, and the upper edge of the water bowl is flanged outwardly and over said upper edge of the housing so recessed.

4. The livestock waterer as defined in claim 1 wherein the upper edge of the water bowl is flanged outwardly and over the upper edge of the housing.

5. The livestock waterer as defined in claim 1 wherein one or more captive or slave bowls are associated with but at some distance from said water bowl assembly, and means for supplying water to said captive or slave bowls comprises an outlet between said valving means in said rigid conduit and said valve bowl assembly.

6. The livestock waterer as defined in claim 1 wherein a check valve in the bottom of said water bowl has a disc face perpendicular to its axially positioned stem, and the water inlet to said water bowl terminates below said disc face, thereby permitting water to be admitted to the bowl very rapidly but without undue turbulence.

7. The livestock waterer as defined in claim 1 wherein an electric heater of sufficient capacity to prevent the freezing of water in the water bowl assembly in juxtaposition to the bottom of said water bowl.

8. The livestock waterer as defined in claim 1 wherein selective locking means hold the supporting post securely when said valving means in said rigid conduit is completely closed, the water bowl is separable from said supporting post, and a check valve in the bottom of said water bowl is closed as said water bowl is removed from said post, thereby permitting removal of said bowl for cleaning without the discharge of water from the bowl into the housing.

References Cited in the file of this patent

UNITED STATES PATENTS

| | | |
|---|---|---|
| 54,009 | Pickett | Apr. 17, 1866 |
| 154,823 | Barns | Sept. 8, 1874 |
| 352,047 | Dewey | Nov. 2, 1886 |
| 755,438 | Bienenstock | Mar. 22, 1904 |
| 1,160,511 | Imschweiler | Nov. 16, 1915 |

FOREIGN PATENTS

| | | |
|---|---|---|
| 365,921 | Germany | Dec. 23, 1922 |